United States Patent
Kitaura et al.

(10) Patent No.: US 11,040,883 B2
(45) Date of Patent: Jun. 22, 2021

(54) GRAPHITE PLATE AND PRODUCTION METHOD THEREOF

(71) Applicant: Panasonic Intellectual Property Management Co., Ltd., Osaka (JP)

(72) Inventors: Hidetoshi Kitaura, Osaka (JP); Naomi Nishiki, Kyoto (JP); Atsushi Tanaka, Osaka (JP); Kimiaki Nakaya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 659 days.

(21) Appl. No.: 15/485,763

(22) Filed: Apr. 12, 2017

(65) Prior Publication Data

US 2017/0320740 A1 Nov. 9, 2017

(30) Foreign Application Priority Data

May 9, 2016 (JP) .............................. JP2016-093552

(51) Int. Cl.
*B32B 9/00* (2006.01)
*C01B 32/22* (2017.01)
*C01B 32/20* (2017.01)
*C09K 5/14* (2006.01)
*B82Y 30/00* (2011.01)

(52) U.S. Cl.
CPC .............. *C01B 32/22* (2017.08); *C01B 32/20* (2017.08); *C09K 5/14* (2013.01); *B82Y 30/00* (2013.01); *C01P 2002/70* (2013.01); *C01P 2006/32* (2013.01)

(58) Field of Classification Search
CPC ........ C01B 30/04; B82Y 30/00; Y10T 428/30
USPC .......................................... 428/408; 423/448
See application file for complete search history.

(56) References Cited

U.S. PATENT DOCUMENTS

| | | | | |
|---|---|---|---|---|
| 3,993,738 A | * | 11/1976 | Overholser | ........... C04B 35/532 |
| | | | | 423/448 |
| 4,954,193 A | | 9/1990 | Murakami et al. | |
| 5,268,239 A | * | 12/1993 | Roche | ................ H01M 8/0213 |
| | | | | 429/453 |
| 5,449,507 A | | 9/1995 | Murakami et al. | |
| 5,766,765 A | * | 6/1998 | Inoue | ....................... B32B 9/00 |
| | | | | 428/408 |

FOREIGN PATENT DOCUMENTS

| | | | |
|---|---|---|---|
| EP | 449312 | A2 | 10/1991 |
| JP | 64-056364 | A | 3/1989 |
| JP | 3-279207 | A | 12/1991 |
| JP | 4-202052 | A | 7/1992 |
| JP | 4-202054 | A | 7/1992 |
| JP | 5-123141 | A | 5/1993 |

(Continued)

*Primary Examiner* — Daniel H Miller
(74) *Attorney, Agent, or Firm* — Panasonic IP Management; Kerry S. Culpepper

(57) ABSTRACT

Provided is a graphite plate, consisting essentially of: graphite; and pores, wherein said graphite plate has a porosity from 1% to 30%. Further provided is a method for producing a graphite plate, including: applying welding pressure to at least one glass-like carbon material in a state in which said at least one glass-like carbon material is maintained in an inert atmosphere under heating conditions, to produce a graphite plate having a porosity from 1% to 30%.

11 Claims, 3 Drawing Sheets

(56) References Cited

FOREIGN PATENT DOCUMENTS

| | | |
|---|---|---|
| JP | 8-229646 A | 9/1996 |
| JP | 2002-308611 | 10/2002 |
| JP | 2005-314168 A | 11/2005 |

* cited by examiner

GRAPHITE PLATE AND PRODUCTION METHOD THEREOF

TECHNICAL FIELD

The technical field relates to a graphite plate and a production method thereof. In particular, the technical field relates to a graphite plate that can be used as a heat-releasing sheet or heat spreader, and a production method thereof.

BACKGROUND

In recent years, downsizing, thinning, and weight reduction of mobile devices such as smartphones, tablets and notebook computers have progressed. Furthermore, processing performance of such mobile devices has significantly improved. With the improved processing performance, power consumption by their CPUs (central processing units) has increased. As a result, the CPUs produce heat. Therefore, various means for releasing heat from CPUs have been employed.

To achieve high heat-releasing performance in a CPU, it is required that an amount of heat that is conveyed by a heat-releasing member, i.e., an amount of neat transport thereof, is increased.

To increase the amount of heat transport, it would be required that a thickness or heat conductivity of the heat-releasing member is increased. Furthermore, a heat-releasing means based on heat of evaporation of a liquid (e.g., a heat pipe) can be mentioned as an alternative means. However, a heat-releasing member such as a heat pipe would have a thickness or length of several millimeters. Therefore, in a mobile device for which thinning on the millimeter scale needs to be achieved, an alternative heat-releasing member that enables such thinning of the device would be required.

Heat pipes are formed of a metal such as copper, which has higher heat conductivity. If heat pipes are made thinner than usual, liquids inside the heat pipes will not circulate therein. As a result, amounts of heat transport in such thinned heat pipes will be equal to merely amounts of heat transport by heat conductance of the metal such as copper, and therefore, will result in amounts of heat transport approximately equal to those realized by copper plates.

Because of the above reason, heat-releasing means based on graphite sheets have widely been used as thin heat-releasing members. In particular, highly-oriented graphite sheets that are obtained by heating polymer sheets made of polyimides or the like have higher heat conductivities compared with graphite sheets that are prepared by rolling exfoliated graphite through rolls. Therefore, such highly-oriented graphite sheets have been adopted as heat-releasing members for parts such as CPUs and GPUs (graphics processing units), which produce larger amounts of heat.

Such highly-oriented graphite sheets have been produced by heating polymer films to around 300° C. (JP-A-2002-308611).

FIG. 5 is a diagram that shows a cross-section of a conventional highly-oriented graphite sheet disclosed in JP-A-2002-308611.

With regards to the cross-section of the highly-oriented graphite sheet in FIG. 5, it is observed that layers of graphite are formed, and the layers appears to partially be combined with each other. However, there are many pores therein.

SUMMARY

However, there are many pores inside conventional highly-oriented graphite sheets as mentioned above. As a result, the graphite sheets have heat-insulation properties due to the presence of gases in the pores. This is because oxygen, nitrogen and hydrogen gases that have been produced during the high-temperature heat treatment remain in the sheets in the form of bubbles in cases where polymer films that serve as materials for the highly-oriented graphite sheets have thicknesses of about 100 μm. That is, the produced gases cause the pores inside the graphite sheets.

The heat conductivity of graphite itself is about 1500 W/m·K, and thus, is very high. However, the heat conductivities of the oxygen and the nitrogen present in the pores are about 0.026 W/m·K, and the heat conductivity of the hydrogen present therein is about 0.018 W/m·K. Thus, the heat conductivities of the gases are very low. As a result, the heat conductivity of the graphite sheet including the pores would be about 800 W/m·K, and thus, would be lower.

Furthermore, there have been attempts at stacking thin graphite sheets that each do not have any pores. However, resin-based adhesives are used for stacking the graphite sheets, and, in that case, most of the resin-based adhesives have heat conductivities of about 0.1 W/m·K, and the overall heat conductivity will be lowered due to formation of adhesive layers. As a result, even if such adhesives are used to increase the thicknesses of the resulting graphite sheets, their amounts of heat transport will not be very high.

Meanwhile, highly-oriented graphite blocks having crystalline structures such as single crystals do not have any pores, and their heat conductivities are about 1500 W/m·K.

However, such highly-oriented graphite blocks do not have sufficient flexibility. For this reason, when the highly-oriented graphite blocks are used as members for heat-releasing mechanisms, distortions will be caused in the highly-oriented graphite blocks due to even slight differences in levels of components included in devices. As a result, cracks will be caused in the highly-oriented graphite blocks, and thus, the cracks will impede the heat transport.

The disclosure solves the above-described problems in the conventional arts, and has the purpose of providing a thick graphite plate that has high heat conductivity and flexibility.

In order to achieve the above purpose, provided is a graphite plate, consisting essentially of: graphite; and pores, wherein said graphite plate has a porosity from 1% to 30%. Further provided is a method for producing a graphite plate, including; applying welding pressure to at least one glass-like carbon material in a state in which said at least one glass-like carbon material is maintained in an inert atmosphere under heating conditions, to produce a graphite plate having a porosity from 1% to 30%.

According to the disclosure, it becomes possible to provide a highly-heat-conductive graphite plate that has a lower porosity and that has a thickness from about several tens of micrometers to about several millimeters.

DESCRIPTION OF EMBODIMENTS

Method for Producing a Graphite Plate

Figure 1:
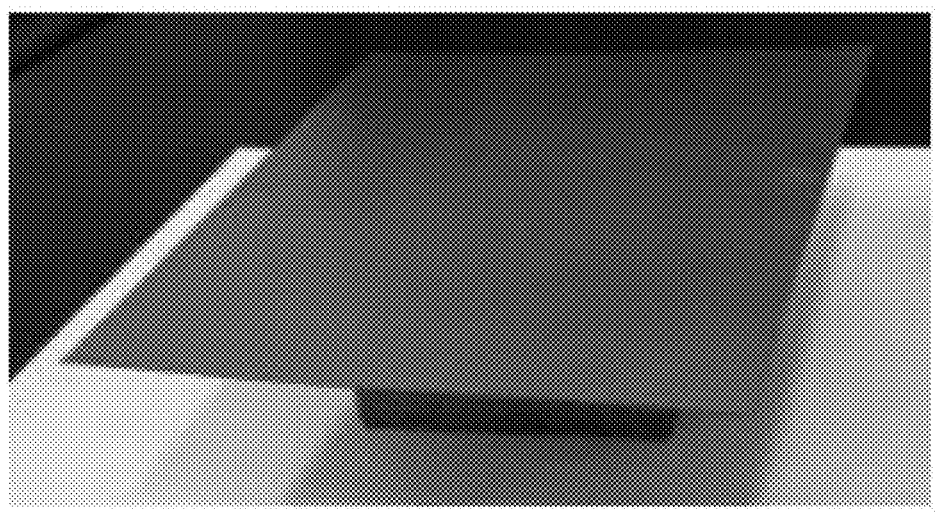
FIG. 1 is a photo that shows an appearance of a graphite plate according to EXAMPLE 1.

The method for producing a graphite plate according to the disclosure can include: (i) a glass-like carbon product ion step; (ii) a molding-preparatory step; and (iii) a molding step.

In the glass-like carbon production step (Step (i)), at least one or more film materials may be subjected to a heat treatment at 400° C. to 2000° C. to obtain at least one or more glass-like carbon materials. A temperature-increasing rate therefor may be from 1° C./minute to 5° C./minute. In this case, the glass-like carbon material refers to non-crystalline or amorphous graphite.

In the molding-preparatory step (Step (ii)), at least one or more glass-like carbon materials obtained in the glass-like carbon production step are stacked. However, this step will not be required when stacked multiple film materials are converted into stacked glass-like carbon materials in the glass-like carbon production step (i.e., Step (i)).

In the molding step (Step (iii)), the at least one or more glass-like carbon materials are maintained at a temperature higher than the temperature in the heat treatment in Step (i), in an inert atmosphere inside a mold, and are molded at an appropriate pressure (e.g., at 0.5 MPa to 30 MPa), to produce a graphite plate having a porosity from 1% to 30%. Thus, the molding temperature is adjusted to be at least higher than the temperature in the heat treatment in the glass-like carbon production step, e.g., 2200° C. or higher.

With regards to Step (i), the temperature for the carbonization heat treatment for producing the at least one or more glass-like carbon materials may range from 400° C. to 2000° C.

With regards to Step (ii), after at least glass-like carbon materials are produced, the multiple pieces of the glass-like carbon materials may be stacked.

In Step (iii), the stacked glass-like carbon materials may be subjected to a temperature-raising step, and a molding step in this order. Alternatively, the temperature-raising step and the molding step may simultaneously be carried out. Accordingly, graphitization of the glass-like carbon materials will be progressed, and thus, a graphite plate in which graphite layers are oriented parallel to the pressed surfaces is produced.

In the temperature-raising step and the molding step, the glass-like carbon materials may be molded based on a molding pressure of 0.5 MPa or higher while being maintained at 2200° C. or higher. If the temperature is lower than 2200° C., a crystal structure of graphite may not be formed, and thus, the amount of heat transport may be lower.

If the molding pressure is lower than 0.5 MPa, thin polymer film materials may not be adhered to one another, and if may be impossible to obtain a graphite plate having a desired thickness.

If the molding pressure is higher than 30 MPa, a graphite material that serves as a molding jig may be deformed when the materials is heated to 2200° C. or higher. As a result, in that case, it may become impossible to obtain a planar graphite plate.

When the material is cooled, a cooling rate therefor may be 20° C./minute while it is cooled from the highest temperature to 1500° C. If a larger cooling rate is adopted, the produced graphite plate may rapidly contract, and wrinkles may be caused on surfaces of the graphite plate. If wrinkles are caused on the surfaces of the graphite plate, the crystal structure of the graphite plate would be corrupted in parts where the wrinkles are present, and thus, the heat conductivity of the graphite plate would be lowered. That is, if wrinkles are present when a heat-generating component such as a CPU or heat sink, and the graphite plate are brought into contact with each other, the heat conductive performance of the graphite plate may be deteriorated. Therefore, such wrinkles are undesirable.

Furthermore, the molding pressure may be set to become maximum when cooling is started. The molding pressure may be reduced at a constant rate to be 0 MPa when the temperature decreases to 1500° C. In particular, if the molding pressure is released in cases where the molding pressure is 10 MPa or higher at the start of cooling, the stacked glass-like carbon materials are not brought into close contact with each other, and therefore, a graphite plate cannot be obtained. Furthermore, if the molding pressure is continuously applied to the materials during cooling, the graphite plate is dragged by contraction of the pressure-applying jig, and cracks will be caused on the surfaces of the graphite plate.

Film Materials

For the material films used in embodiments, polymer films are preferable. As examples of polymer films, polyimides (PI), polyamides (PA), polyoxadiazoles (POD), polybenzothiazoles (PBT), polybenzobisthiazoles (PBBT), polybenzoxazoles (PBO), polybenzobisoxazoles (PBBO), polyparaphenylene vinylenes (PPV), polyphenylenebenzimidazoles (PBI), polyphenylenebenzobisimidazole (PPBI), and polythiazoles (PT) can be mentioned.

A heat-resistant aromatic polymer film(s) including at least one polymer selected from among the above-mentioned polymers is preferably used as a film material(s). This is because use of such a polymer film causes the finally-produced graphite plate to have higher electroconductivity and heat conductivity. The polymer film(s) may be produced by known manufacturing techniques.

Among others, polyimides are preferable since polyimides having various structures and properties can be prepared by selecting various monomer materials.

Furthermore, the film material(s) that is/are converted into a graphite plate preferably has/have a thickness of 75 μm or less. If a film material having a thickness larger than 75 μm is used as a starting material, crystallinity of the resulting graphite plate may be distorted depending on timing of generation of gases. This lowers the heat conductivity of the graphite plate. As a result, the resulting graphite plate may not be employed as a heat-conveying material.

Hereinafter, embodiments of the disclosure will be described with reference to the drawings.

EXAMPLE 1

Graphite plates were produced based on conditions for production steps described below.

In the glass-like carbon production step (i), 20 pieces of polyimides films (Kapton film manufactured by DU PONT-TORAY CO., LTD.) each having a thickness of 25 μm were stacked as the film material. The film material was treated under conditions: a heat treatment temperature of 1500° C.; and a temperature-increasing rate of 3° C./minute.

In the molding-preparatory step, 20 pieces of glass-like carbon materials obtained by the above treatment were stacked.

In molding step (iii), the 20 pieces of glass-like carbon materials stacked in the above step were maintained at 2500° C. in an inert atmosphere inside a mold, and were pressed at a molding pressure of 20 MPa, thereby producing a graphite plate.

FIG. 1 is a photo that shows an appearance of the graphite plate produced in EXAMPLE 1.

As described above, the graphite plate was produced by stacking 20 pieces of polyimides films that each had a thickness of 25 μm and that served as the film material. As a result, the graphite plate had a thickness of 200 μm.

A mosaic spread of the graphite plate produced in EXAMPLE 1 was measured by use of an X-ray diffractometer. The mosaic spread was 3°, and thus, was a favorable value. This revealed that the crystallization progressed as graphite. In addition, a mosaic spread (MS) is an index that shows a degree of orientation of the c-axes of the crystals in graphite. That is, the mosaic spread is a width of a diffraction angle when the X-ray diffraction intensity of the (002) plane of plate-shaped graphite becomes half. The smaller the mosaic spread is, the more preferable the crystallinity is.

Figure 2:
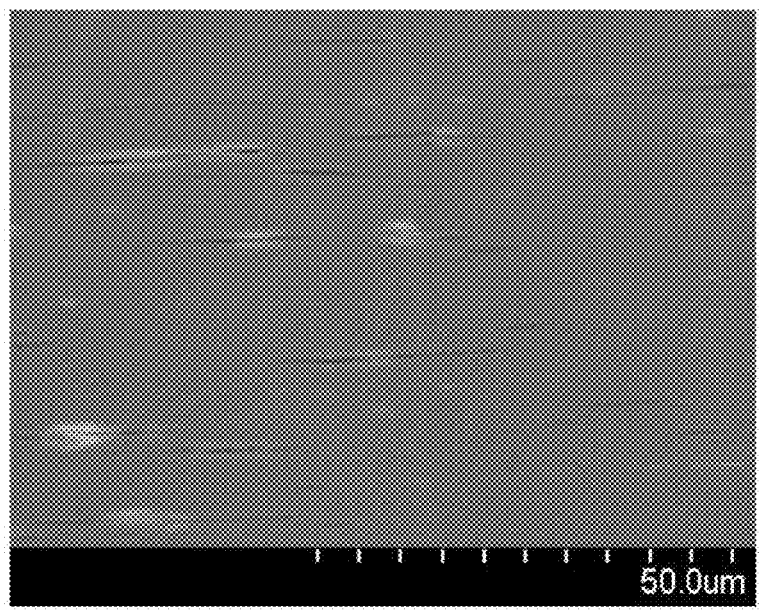
FIG. 2 is an SEM that shows a cross-section of the graphite plate according to EXAMPLE 1.

FIG. 2 is an SEM of a cross-section of the graphite plate produced in EXAMPLE 1. Dark gray spots correspond to pores in the cross-section SEM. White spots correspond to edges of the pores that glitter due to edge effects. Larger pores that are found on a highly heat-conductive graphite sheet produced without any pressurization are not confirmed on the produced graphite plate, and it can be observed that the graphite plate has a compact cross-section.

In order to obtain a porosity in the cross-section of the graphite plate produced in EXAMPLE 1 of the disclosure, FIG. 2 was binarized based en image processing. As a result, the porosity was 1%.

In addition, the heat conductivity of the graphite plate prepared in Example 1 of the disclosure was 1500 W/m·K, and thus, was high.

EXAMPLES 2 to 10

A series of graphite plates were prepared based on the same production steps as in Example 1 except that conditions shown in Tables 1 and 2 were adopted. Porosities and heat conductivities of the examples were compared.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| Film thickness [μm] | 25 | 25 | 25 | 25 | 25 | 25 | 25 |
| Heat treatment temperature [° C.] | 1500 | 2000 | 400 | 1000 | 1000 | 1000 | 1000 |
| Temperature-increasing rate [° C./minute] | 3 | 5 | 1 | 3 | 3 | 3 | 3 |
| Numbers of films [Number] | 20 | 5 | 100 | 20 | 100 | 100 | 20 |
| Heat treatment temperature [° C.] | 2500 | 2500 | 2500 | 2500 | 2500 | 2500 | 2500 |
| Pressure [MPa] | 20 | 20 | 20 | 5 | 5 | 20 | 10 |
| Thickness [μm] | 200 | 50 | 1100 | 200 | 1100 | 1100 | 200 |
| Mosaic spread [°] | 3 | 3 | 3 | 6.5 | 6.5 | 3 | 3.5 |
| Porosity [%] | 1 | 1 | 1 | 30 | 30 | 1 | 10 |
| Heat conductivity [W/m · K] | 1500 | 1500 | 1500 | 1000 | 1000 | 1500 | 1480 |
| Acceptability of heat conductivity | Acceptable | Acceptable | Acceptable | Acceptable | Acceptable | Acceptable | Acceptable |
| Acceptability of flexibility | Acceptable | Acceptable | Acceptable | Acceptable | Acceptable | Acceptable | Acceptable |
| Overall judgment | Acceptable | Acceptable | Acceptable | Acceptable | Acceptable | Acceptable | Acceptable |

TABLE 2

|  | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 |
|---|---|---|---|---|---|---|
| Film thickness [μm] | 25 | 25 | 25 | 25 | 25 | 25 |
| Heat treatment temperature [° C.] | 1000 | 1000 | 400 | 1500 | 1000 | 300 |
| Temperature-increasing rate [° C./minute] | 3 | 3 | 1 | 3 | 3 | 1 |
| Numbers of films [Number] | 20 | 20 | 140 | 20 | 20 | 150 |
| Heat treatment temperature [° C.] | 2500 | 2500 | 2500 | 2500 | 2500 | 2500 |

TABLE 2-continued

|  | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 |
|---|---|---|---|---|---|---|
| Pressure [MPa] | 7 | 5.5 | 20 | 4 | 25 | 4 |
| Thickness [μm] | 200 | 200 | 1500 | 200 | 200 | 1600 |
| Mosaic spread [°] | 4 | 5 | 6.5 | 7.5 | 1.6 | 7.5 |
| Porosity [%] | 15 | 20 | 30 | 32 | 0.5 | 31 |
| Heat conductivity [W/m · K] | 1440 | 1300 | 1500 | 800 | 1530 | 900 |
| Acceptability of heat conductivity | Acceptable | Acceptable | Acceptable | Unacceptable | Acceptable | Acceptable |
| Acceptability of flexibility | Acceptable | Acceptable | Acceptable | Acceptable | Unacceptable | Unacceptable |
| Overall judgment | Acceptable | Acceptable | Acceptable | Unacceptable | Unacceptable | Unacceptable |

In all the examples, polyimides films (Kapton film manufactured by DU PONT-TORAY CO., LTD.) each having a thickness of 25 μm were used.

COMPARATIVE EXAMPLES 1 to 3

As comparative examples, a series of graphite plates were prepared based on the above-described steps for production of a graphite plate except that conditions shown in Tables 1 and 2 were adopted.

Acceptance Criteria

For acceptance criteria, when a sample exhibited a heat conductivity exceeding 1000 W/m·K, and did not nave any cracks in a flexibility-evaluation test, then, the sample was considered acceptable. Other samples were considered unacceptable.

Heat Conductivities

An acceptance standard for heat conductivities was determined as follows. A heat conductivity of a graphite sheet that is prepared by compressing commercially-available exfoliated graphite is about 800 W/m·K. Therefore, 1000 W/m·K, which is 200 W/m·K larger than the above-mentioned heat conductivity, was adopted as an acceptance standard for heat conductivities.

When a heat conductivity of a graphite plate is 200 W/m·K or larger than the heat conductivity of the above-mentioned graphite sheet (i.e., 800 W/m·K), it is expected that the amount of heat transport of the graphite plate is 1.3 times greater than that of the graphite sheet, provided that the thicknesses of the graphite sheet and the graphite plate are the same.

Flexibility-Evaluation Test

Figure 3:
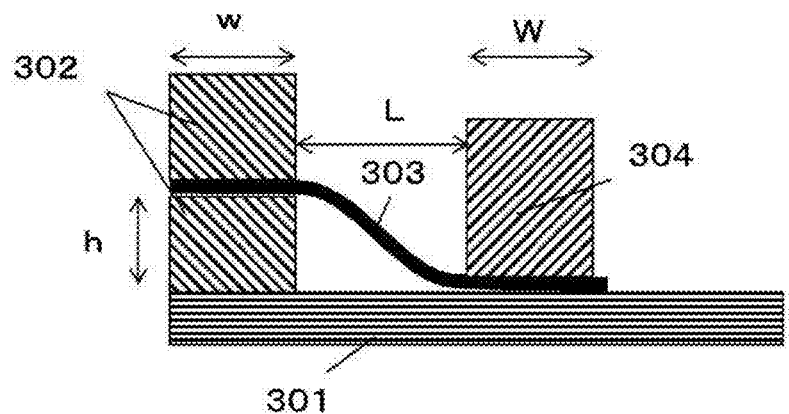
FIG. 3 is a schematic view that depicts a flexibility-evaluation test carried out with respect to graphite plates obtained in examples.

The flexibility-evaluation test was carried out by simulating a shape of a graphite plate when it is placed as a heat-releasing member on a circuit substrate or the like. FIG. 3 is a cross-section diagram that schematically depicts the flexibility-evaluation test.

At first, a graphite plate 303 that had been fixed (placed) between fixing jigs 302 was set on a planar plate 301. The graphite plate 303 was bent toward the planar plate 301 by a holding jig 304. In that case, when any cracks were not caused in the graphite plate 303, the graphite plate 303 was considered acceptable. On the other hand, when cracks were caused therein, the graphite plate 303 was considered unacceptable.

A width w and a height h of each, fixing jig 302 were 10 mm and 2 mm, respectively, a width of the holding jig 304 was 10 mm, and a distance L between the edges of the holding jigs 302 and the edge of the holding jig 304 was 15 mm.

Discussion

Thickness

Numbers of film materials were varied from 5 to 100 through EXAMPLES 1 to 3. With regards to the thicknesses of the produced graphite plates 302, the thickness of EXAMPLE 1 was 200 μm, the thickness of EXAMPLE 2 as 5 μm, and the thickness of EXAMPLE 3 was 1100 μm. All of their heat conductivities were 1500 W/m·K irrespective of the thickness of the graphite plate, and thus, were very high.

Welding Pressure

In EXAMPLES 4 to 6, the welding pressures were varied from 5 MPa to 20 MPa. Heat conductivities of EXAMPLES 4 and 5 were 1000 W/m·K, and the heat conductivity of EXAMPLE 6 was 1500 W/m·K.

In COMPARATIVE EXAMPLE 1, the welding pressure was adjusted to 4 MPa. The porosity was 32%, and thus, was larger. The heat conductivity was 800 W/m·K, and thus, was lower.

In COMPARATIVE EXAMPLE 2, the welding pressure was adjusted to 25 MPa. The porosity was 0.5%. The heat conductivity was 1530 W/m·K, and thus, was higher. However, when the sample in COMPARATIVE EXAMPLE 2 was placed as a heat-releasing member in the flexibility-evaluation test, the sample was inflexible, and therefore, was cracked. Thus, the sample cannot be employed as a heat-releasing member. Based on the above-described results, it is revealed that, in cases where porosities range from 1% to 30%, the heat conductivities become higher, and therefore, the resulting graphite plates are usable as heat-releasing members.

Furthermore, based on EXAMPLES 7 to 9, porosities and heat conductivities in cases where welding pressures were varied were obtained. As the welding pressures decreased from 10 MPa to 5.5 MPa, the heat conductivities also decreased from 1480 W/m·K to 1300 W/m·K.

Porosities and Heat Conductivities

Figure 4:
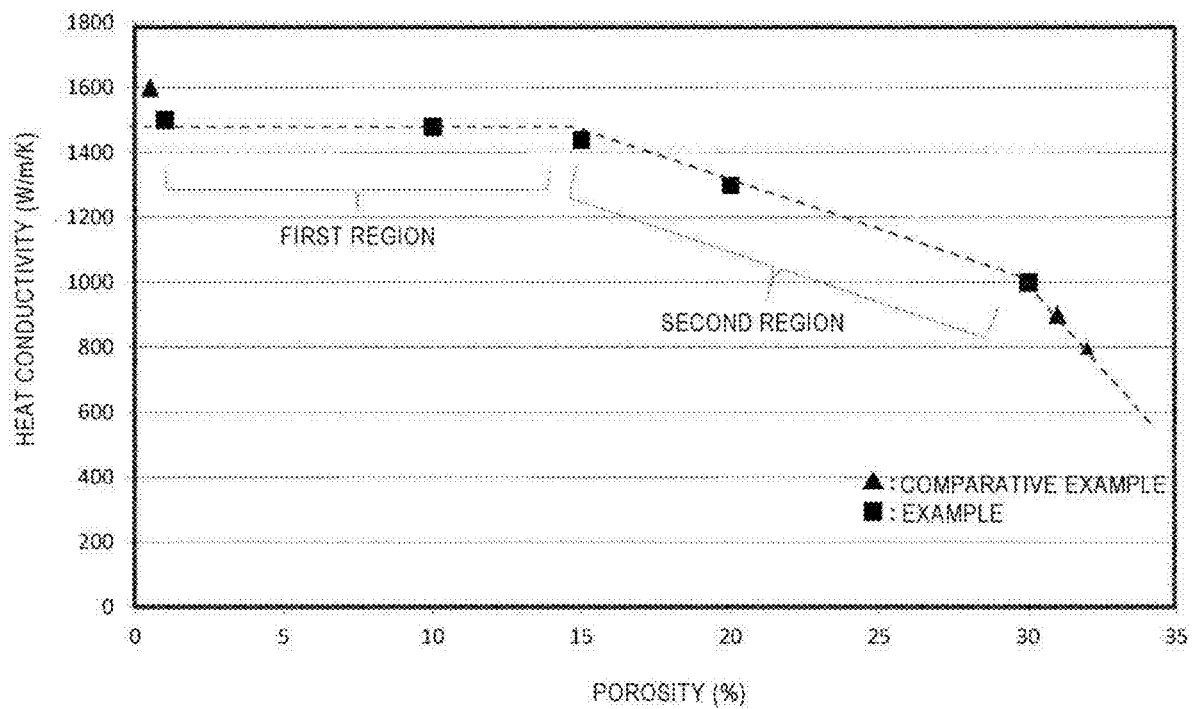
FIG. 4 is a diagram that shows relationships between porosities and heat conductivities among examples and comparative examples.
Figure 5:
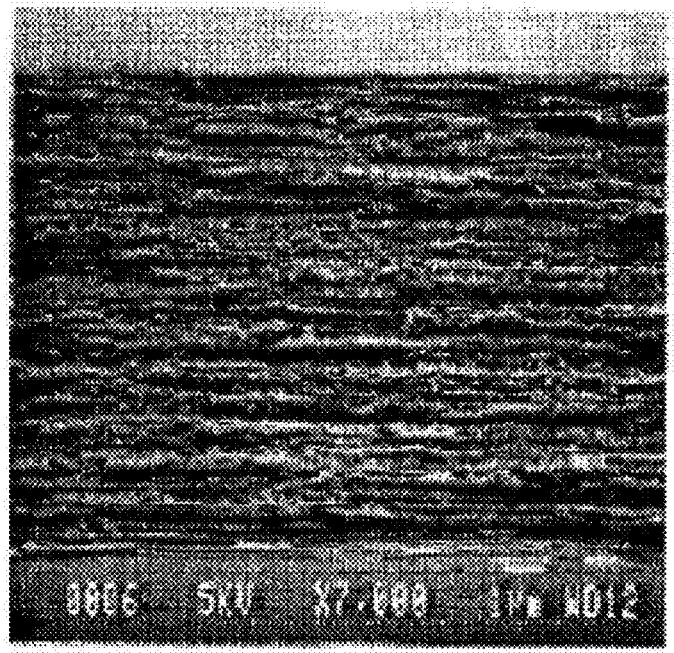
FIG. 5 is a cross-sectional view of the conventional highly-oriented graphite sheet disclosed in JP-A-2002-308611.

Porosities and heat conductivities obtained in all of the examples and the comparative examples are shown in FIG. 4. In the first region in which the porosities range from 0% to 15%, the heat conductivities are higher. Next, in the second region where the porosities are more than 15% to 30%, the neat conductivities monotonically decrease. When the porosities were larger than 30%, the heat conductivities rapidly decrease.

When a graphite plate is used as a cooling mechanism, it is preferred that its heat conductivity is higher. Its porosity is preferably from 1% to 30%, more preferably from 1% to 15%.

Mosaic Spread

A mosaic spread refers to crystallinity. When the porosity is smaller, the crystallinity becomes higher, and the mosaic spread becomes smaller. According to Tables 1 and 2, the mosaic spread is preferably from 3° to 6.5°, more preferably from 3° to 5°.

Thickness

In EXAMPLE 10, 140 pieces of polyimide films (Kapton film manufactured by DU PONT-TORAY CO., LTD.) each having a thickness of 25 μm were stacked to prepare a graphite plate. The thickness of the prepared graphite plate was 1500 μm, the heat conductivity was 1500 W/m·K, and the porosity was 1%. Also, any cracks were not caused in the flexibility-evaluation test.

In COMPARATIVE EXAMPLE 3, the welding pressure was adjusted to 4 MPa, and 150 pieces of polyimide films (Kapton film manufactured by DU PONT-TORAY CO., LTD.) each having a thickness of 25 μm were stacked to prepare a graphite plate. The thickness of the prepared graphite plate was 1600 μm, the heat conductivity was 900 W/m·K, and the porosity was 31%. However, cracks were caused in the flexibility-evaluation test. Based on the results obtained in EXAMPLES 2 and 10, and COMPARATIVE EXAMPLE 3, the thickness of the graphite plate is preferably from 50 μm to 1500 μm.

The graphite plate has a porosity ranging from 1% to 30%, and thus, exhibits higher heat conductivity. Accordingly, the graphite plate can be used as a heat-releasing member.

Overview

With regards to the graphite plate according to the disclosure, parts other than pores are made essentially of graphite. However, the graphite plate inevitably includes oxygen and nitrogen that cannot be removed by a heat treatment. At least, the concentration of oxygen may be 10 at % or less, and the concentration of nitrogen may be 10 at % or less.

The graphite plate according to the disclosure can be employed as a heat-releasing member not only in electronic devices but also in various devices such as industrial devices and vehicles.

What is claimed is:

1. A graphite plate, consisting essentially of:
   graphite; and
   pores, wherein said graphite plate has a porosity from 1% to 30% and an X-ray diffraction-based mosaic spread from 3° to 6.5°.

2. The graphite plate according to claim 1, having a heat conductivity from 1000 W/m·K to 1500 W/m·K.

3. The graphite plate according to claim 1, having a thickness from 50 μm to 1.5 mm.

4. A method for producing a graphite plate, comprising applying welding pressure from 5 MPa to 20 MPa to at least one glass-like carbon material in a state in which said at least one glass-like carbon material is maintained in an inert atmosphere under heating conditions of 2500° C., to produce a graphite plate having a porosity from 1% to 30%.

5. The method according to claim 4, further comprising subjecting at least one polymer film to a heat treatment at 400° C. to 2000° C. to obtain the at least one glass-like carbon material.

6. The method according to claim 5, wherein the welding pressure is applied to the at least one glass-like carbon material in a state in which said at least one glass-like carbon material is maintained in an inert atmosphere at a heat treatment of 2500° C.

7. The method according to claim 4, wherein the at least one glass-like carbon material includes stacked glass-like carbon materials.

8. The method according to claim 7, further comprising subjecting stacked polymer films to a heat treatment at 400° C. to 2000° C. to obtain the stacked glass-like carbon materials.

9. The method according to claim 7, further comprising stacking multiple glass-like carbon materials to obtain the stacked glass-like carbon materials.

10. The method according to claim 9, further comprising subjecting multiple polymer films to a heat treatment at 400° C. to 2000° C. to obtain the multiple glass-like carbon materials.

11. The graphite plate according to claim 1, wherein the porosity is from 15% to 30% and the X-ray diffraction-based mosaic spread is from 4° to 6.5°.

* * * * *